United States Patent [19]

Staar

[11] Patent Number: 4,523,306
[45] Date of Patent: Jun. 11, 1985

[54] RECORD LOADING APPARATUS FOR A SLOT TYPE RECORD PLAYER

[75] Inventor: Marcel J. H. Staar, Brussels, Belgium

[73] Assignee: Staar S. A., Belgium

[21] Appl. No.: 568,140

[22] Filed: Jan. 4, 1984

[30] Foreign Application Priority Data

Jan. 28, 1983 [BE] Belgium .............................. 0/209993

[51] Int. Cl.³ ....................... G11B 17/04; G11B 25/04
[52] U.S. Cl. .................................. 369/77.1; 369/176; 369/292
[58] Field of Search ..................... 369/77.1, 75.2, 176, 369/292

[56] References Cited

U.S. PATENT DOCUMENTS

2,508,715  4/1945  Harman .
4,302,832  11/1981 Cheeseboro .
4,455,637  6/1984  Suzuki et al. ...................... 369/77.1
4,470,136  9/1984  Takahashi et al. ................. 369/77.1

*Primary Examiner*—Steven L. Stephan
*Attorney, Agent, or Firm*—Leydig, Voit, Osann, Mayer and Holt, Ltd.

[57] ABSTRACT

A record player having a mechanism for guiding and centering records of different sizes on a driving spindle. Two pairs of levers are mounted on a record carrier at diametrically opposed positions. The levers have generally circular hubs mounted on pivots carried by the record support and extending arms including record engaging studs. Insertion of a record engages the studs to pivot the arms which guide the record to a centered position. Alignment of slots in the hubs of at least one of the pairs of levers sense the proper positioning of the record and trigger the player to rotate the record carrier from the load to the play position.

9 Claims, 8 Drawing Figures

RECORD LOADING APPARATUS FOR A SLOT TYPE RECORD PLAYER

The present invention relates to record players, and more particularly to slot type record players having a record carrier for automatically transferring a record from a load position to a play position on a driving spindle.

A record player of that type is described and claimed in commonly owned Schatteman U.S. application Ser. No. 483,698 filed Apr. 11, 1983. That device includes rocking stops on a record carrier which are or are not moved aside in accordance with the diameter of the record being inserted. The record carrier is moved in an inverted L-shaped path in which it is first moved horizontally to a centered position then vertically downward for engagement with the spindle.

There is disclosed and claimed in commonly owned Staar U.S. application Ser. No. 454,240 filed Dec. 29, 1982, a record carrier in which helical inclined ramp members cooperate with corresponding slots such that a limited rotational movement of the record carrier causes simultaneous vertical lowering of the record carrier. The record carrier follows a helical path in translating between load and play positions, ultimately positioning a record on a spindle and drawing slightly out of contact with the record.

While it would be desirable to provide a multiple record size capability with the helically translating carrier disclosed in Staar, the apparatus disclosed in the Schatteman application is not amenable to such a helically moving record carrier.

Accordingly, it is an object of the present invention to provide a multiple size record positioning apparatus which accurately centers a record on a record carrier adapted to move in a helical pattern between load and play positions.

A further object is to provide such a device which is well suited to low cost mass production, but which is highly reliable in operation.

Other objects and advantages will become apparent with reference to the following detailed description when taken in conjunction with drawings in which.

While the invention will be described in connection with a preferred embodiment, there is no intent to limit it to that embodiment. On the contrary, the intent is to cover all alternatives, modifications and equivalents included within the spirit and scope of the invention as defined by the appended claims.

Figure 1:
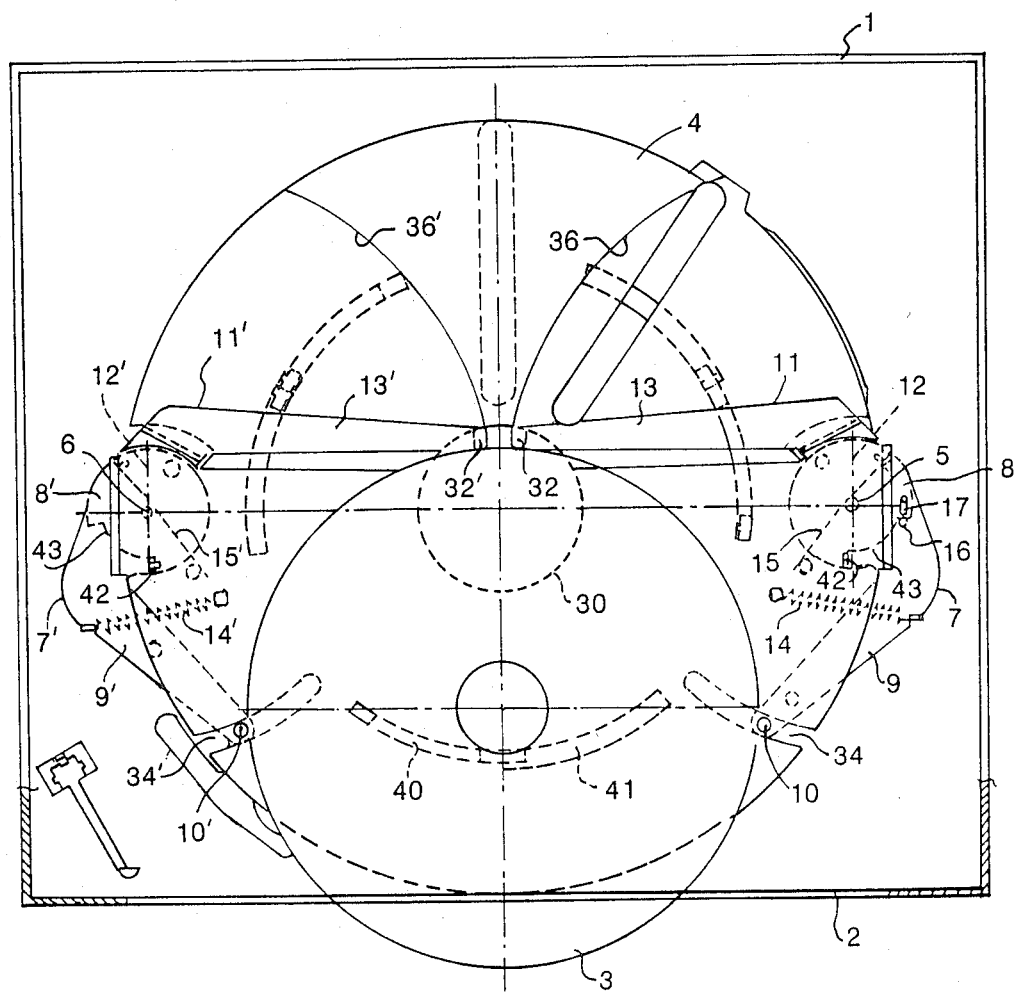
FIG. 1 is a plan view of a record player embodying the present invention illustrating the insertion or ejection of a record of small size.
Figure 3:
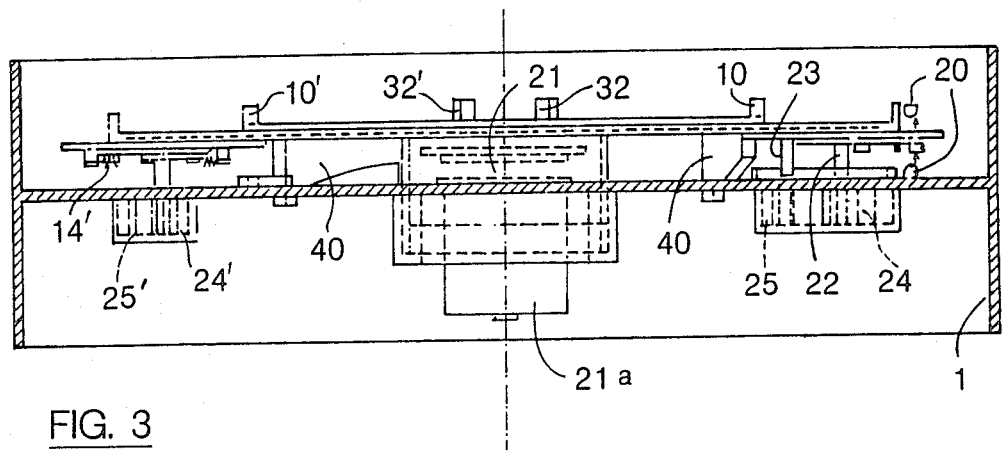
FIG. 3 is a sectional view taken along the line III—III of FIG. 2.

Turning now to the drawings, and particularly to FIGS. 1 and 3, there is shown a record player including record positioning apparatus embodying the present invention. The player is based on a rigid frame 1 having a slot 2 for allowing insertion of a record 3. In the load position, a record support 4 is disposed just below the slot 2 for receiving a record 3. As described in greater detail in the aforementioned Staar application, the record support 4 is arranged for limited counterclockwise rotation to transfer the record to a play position in which the record is engaged for rotation by a spindle 21 driven by a motor 21a. To that end of the record support 4 includes a set of three helical inclined ramp members 40 cooperating with a plurality of arcuate slots 41 such that limited counterclockwise rotation of the support 4 causes the ramp members 40 to descend within the slots 41, resulting in a helical motion of the carrier 40 from its raised load position illustrated in FIG. 1 to its lowered play position illustrated in FIG. 6. Similarly, clockwise rotation of the record support 4 raises the support from the lowered play position to the upper load position. In the preferred embodiment illustrated in the aforementioned Staar application, rotation of the record carrier is accomplished by an auxiliary motor geared to the record support and energized when translation of the support is desired.

In practicing the present invention, guide means are associated with such a helically moving support for assuring that an inserted record of one of a number of predetermined sizes is centered on the spindle as the support, and the record carried thereby, enters the play position. To that end, the record support 4 carries a pair of spindles 5, 6 disposed in a diametrically opposed fashion with respect to the center line of the record support 4. The spindles carry respective sets of lever pairs associated with guides on the record support. The diametrically opposed positioning of the spindles and the interaction between the record and the levers on the one hand and the levers and the guides on the other serve to center the record on the support as the support rotates from the load to the play position.

More particularly, two pairs of levers 7, 11 and $7^1$, $11^1$ are mounted for pivotable movement on the spindles 5, 6 respectively. The levers 7, $7^1$ each have a partially circular hub portion 8, $8^1$ and an arm portion 9, $9^1$ extending from the hub. Each arm 9, $9^1$ carries a stud 10, $10^1$ which projects into the plane of the record through arcuate grooves 34, $34^1$ formed in the record carrier 4. The arms 9, $9^1$ are biased inwardly by tension springs 14, $14^1$ fixed at one end to the record support and at the other to the associated arm.

The levers 11, $11^1$ also have a partly circular hub portion 12, $12^1$ and an arm 13, $13^1$ extending from the hub. Disposed at the ends of the arms 13, $13^1$ are a pair of upstanding record engaging projections 32, $32^1$ disposed in the plane of the record. Arcuate guides 36, $36^1$ are disposed to engage the ends of the arms 13, $13^1$ as they are pivoted outwardly upon engagement with a record. The arms 11, $11^1$ are biased toward the center of the record support by means of torsion springs 15, $15^1$ disposed between the record support and the hub 12, $12^1$. When the lever pairs are disposed on the pivot spindles 5, 6, the hub portion 8, $8^1$ of the levers 7, $7^1$ overlies or is superimposed on the hub portion 12, $12^1$ of the levers 11, $11^1$.

As shown in FIG. 1, when a record of small diameter is first inserted into the player, the record periphery first engages studs 10, $10^1$, causing the levers 7, $7^1$ to pivot outwardly. Upon engagement of the record periphery with the projections 32, 32¹, the levers 11, 11¹ also begin to pivot outwardly, until the apparatus assumes the intermediate condition illustrated in FIG. 3. At that point, trigger means, to be described in detail below, activate the record carrier for limited counterclockwise movement to cause helical motion of the record carrier by way of the helical ramp 40 and associated slots 41, translating the record carrier to the play position illustrated in FIG. 6.

Figure 2:
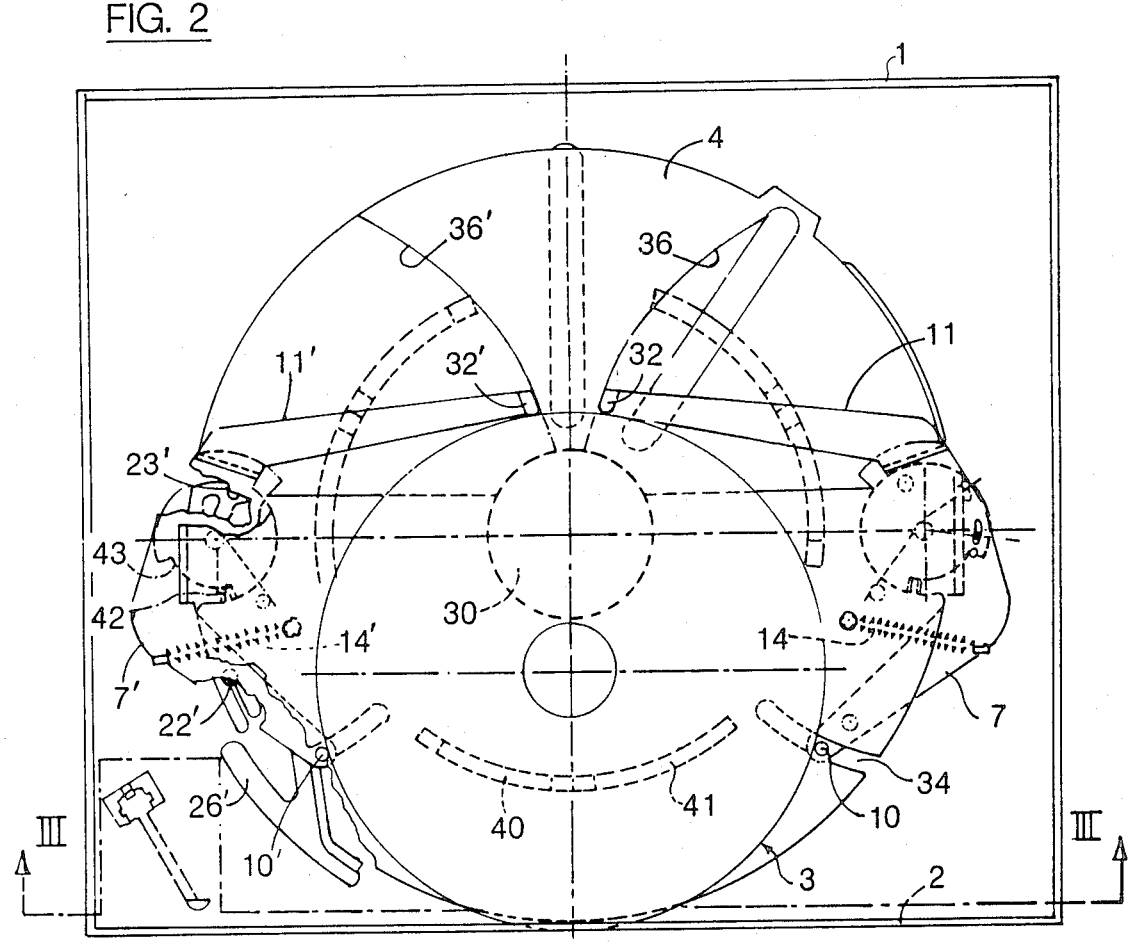
FIG. 2 is a view similar to FIG. 1 in which the small size record has been engaged by the automatic positioning device.
Figure 6:
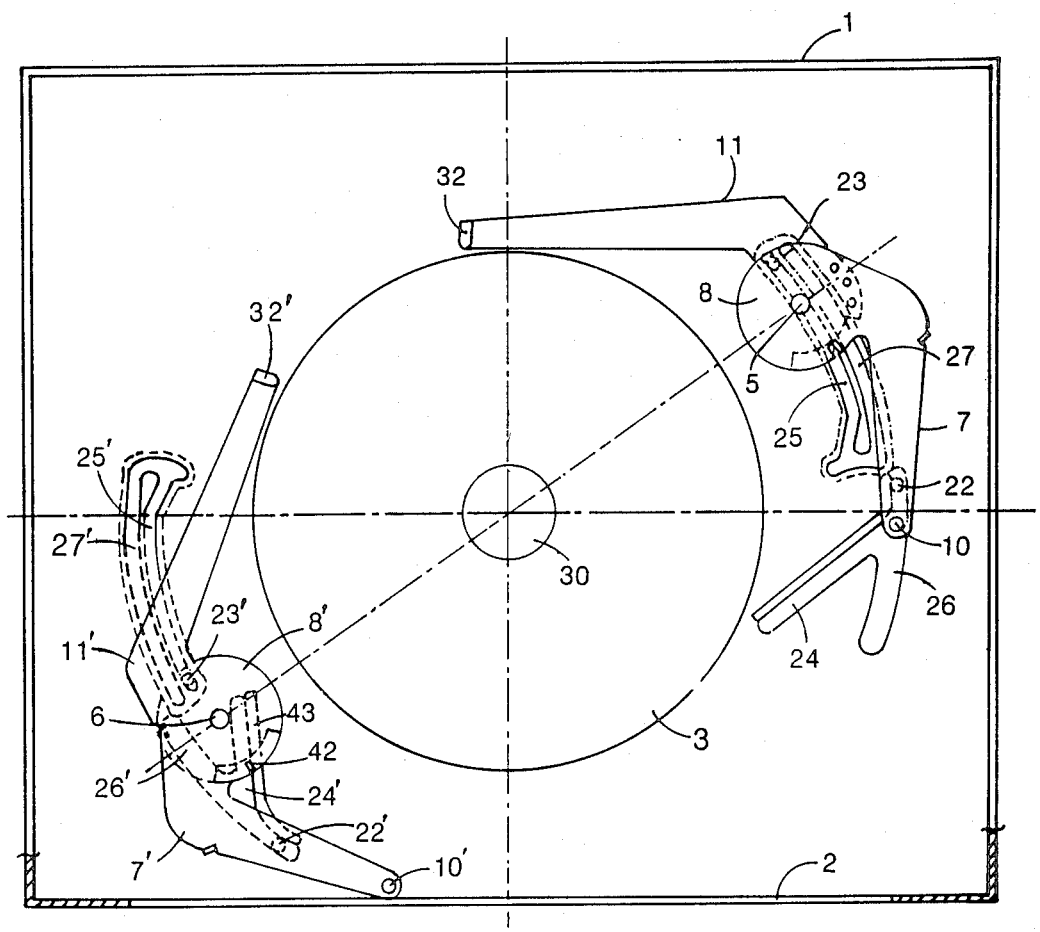
FIG. 6 is a view similar to FIG. 2 showing a record of small size centered in the apparatus.

In practicing the invention, guide means associated with the lever pairs translate the records from the position illustrated in FIG. 2 to the centered position illustrated in FIG. 6 in which the axis of the record is aligned with the axis of the driving spindle. More particularly, beneath the hub portion 12, 12¹ of the levers 11, 11¹ are located studs 23, 23¹ disposed to engage slots 25, 25¹ in the base 1 as the record support rotates in the counterclockwise direction (see FIGS. 2, 3 and 6). The slots are configured to draw the levers 11, 11¹ outwardly, allowing the springs 14, 14¹ to draw the arms 7, 7¹ and the record carried thereby inwardly until the studs 10, 10¹ bottom on the ends of the slots 34, 34¹, centering the record over the spindle. Slots 25, 25¹ are configured to draw the projections 32, 32¹ slightly out of contact with the record as the record support reaches the play position. Disposed near the ends of the arms 7, 7¹ are a further pair of studs 22, 22¹ adapted to engage slots 24, 24¹ formed in the base 1 during rotation of the record carrier. Thus, after the record 3 is centered over the spindle, continued rotation of the record support also draws the studs 10, 10¹ out of contact with the record. In the play position, the record support 4 is disposed slightly below the record which is then supported on the spindle 21 for rotation. [Refer to FIG. 6).

When it is desired to eject the record from the player, the aforementioned auxiliary motor is energized to rotate the record carrier in the clockwise direction, causing helical translation of the carrier to the load position. The studs on the underside of the lever pairs ride within the guides in the base to again engage the record periphery. Near the end of rotation, the studs are raised free of the guides in the base. Springs 15, 15¹ associated with the levers 11, 11¹ are configured to exert a greater force than the springs 14, 14¹ associated with the levers 7, 7¹. Accordingly, the levers 11, 11¹ return to the rest position, forcing the levers 7, 7¹ outwardly and ejecting the record for manual removal as illustrated in FIG. 1.

Figure 7A:
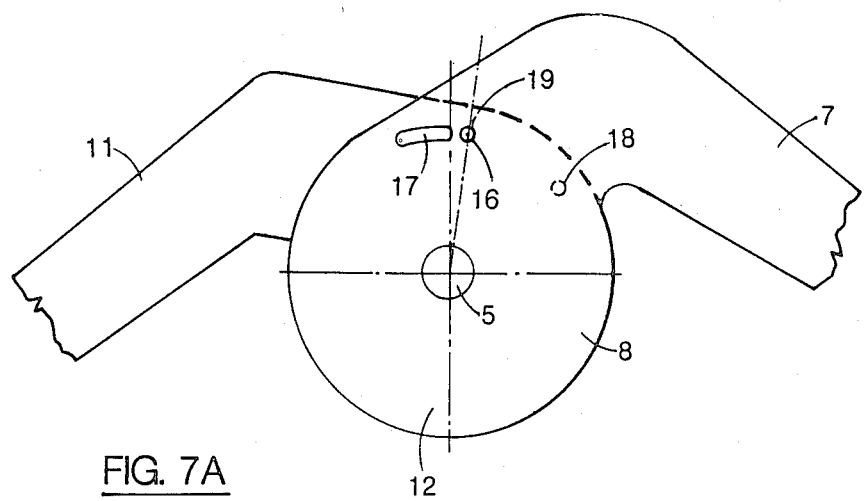
FIGS. 7A and 7B are details showing the relative position of the guiding lever hubs with large and small records respectively inserted in the player.
Figure 7B:
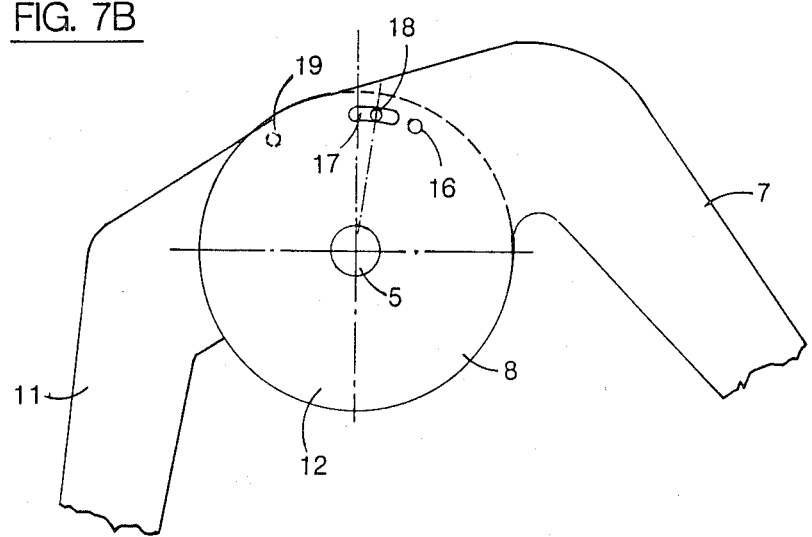

In practicing an important aspect of the invention, trigger means are associated with at least one of the lever pairs and are adapted to sense record size and position for triggering the helical rotation of the record support from the load to the play position. As best shown in FIGS. 7A and 7B, the hub portion of the lever 7 has a pair of perforations 16, 17 and the hub portion of lever 11 has a further pair of perforations 18, 19. As shown in FIG. 2, an opto-electrical device 20 comprising an LED and a phototransister are supported on the base for sensing alignment of a pair of the perforations. When the perforations are aligned at the location defined by the opto-electrical device 20, light from the LED impinges on the phototransistor creating a signal which can be sensed by logic circuitry to energize the aforementioned auxiliary motor for rotation of the record support. FIG. 7B illustrates the relative position of the levers 7, 11 when a small record is inserted on the record support in the position illustrated in FIG. 2. The alignment of the apertures 17, 18 causes the opto-electrical device 20 to produce a signal which triggers rotation of the record carrier, rotating the apparatus to the play position illustrated in FIG. 6.

Figure 4:
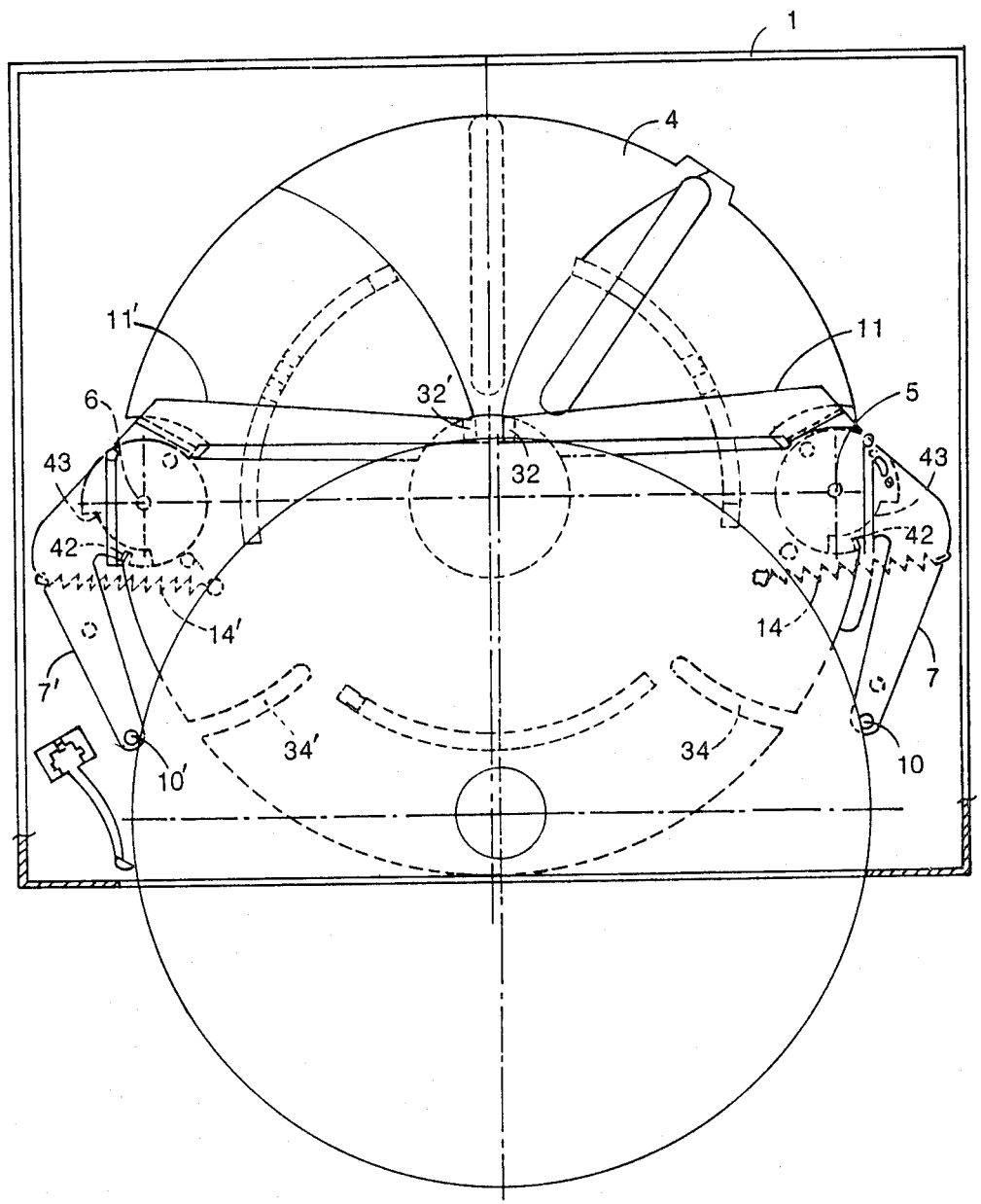
FIG. 4 is a view similar to FIG. 1, but showing the insertion or ejection of a record of large diameter.
Figure 5:
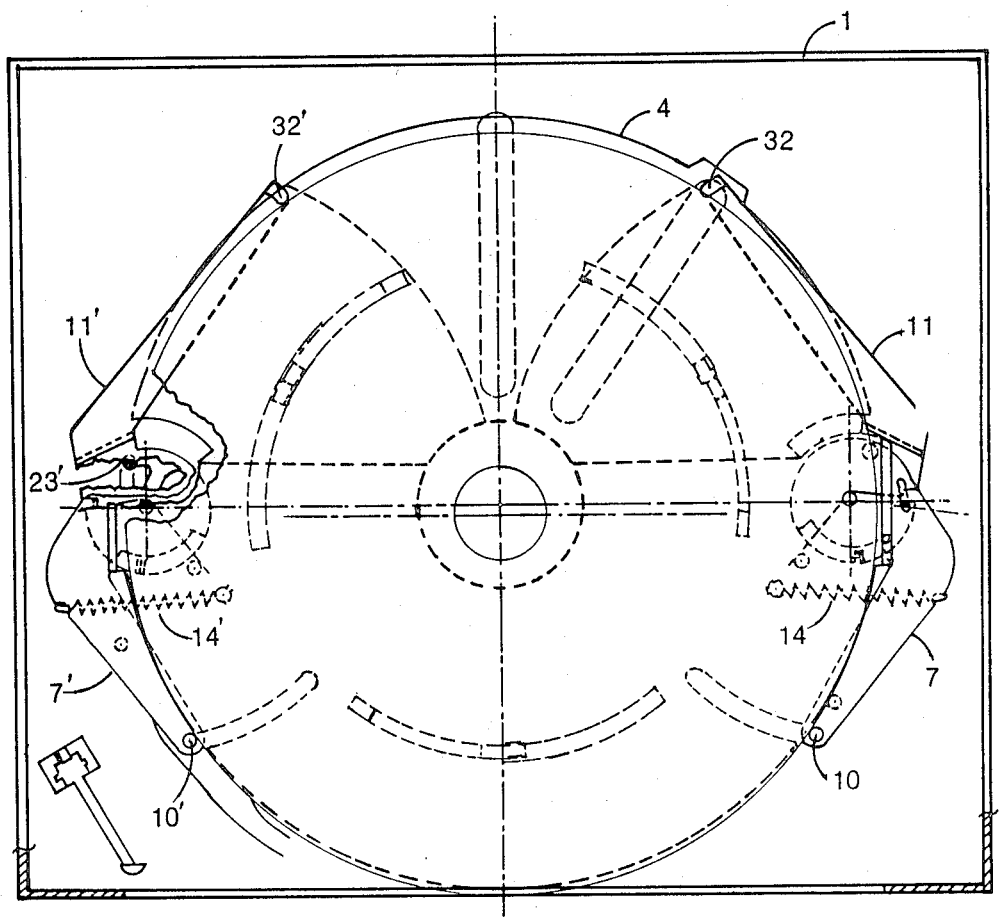
FIG. 5 is a view similar to FIG. 4, but showing the large size record engaged by the automatic positioning device.

Turning now to FIG. 4, there is shown the insertion of a record of large diameter into the apparatus. It is seen that the periphery of the record first contacts the studs 10, 10¹ causing a major deflection thereof. It will be appreciated upon reference to FIGS. 7A and 7B that the major deflection of the arms 7 before any deflection of the arm 11 causes the aperture 18 to pass the aperture 17 at a location other than that defined by the opto-electrical device 20, so as to prevent triggering of the record support during that operation. Continued insertion of the record causes the device to reach the intermediate position illustrated in FIG. 5. It is seen that to reach that position, the levers 11, 11¹ are pivoted outwardly while at some point during the insertion, the levers 7, 7¹ return inwardly, ultimately reaching the relative position illustrated in FIG. 7A in which aperture 16 is aligned with aperture 19 at the location defined by the opto-electrical device 20. At that time, a signal will be created which triggers the auxiliary motor for counterclockwise rotation of the record carrier to the play position. It is seen that in FIG. 5, the record is almost centered on the spindle such that during initial rotation, the lever 7, 7¹ moves the record only slightly to the centered position.

In order to free the lever pairs from the periphery of the record in the play position, the aforementioned studs 22, 22¹ and 23, 23¹ engage further guides in the base 1. More particularly, with reference to FIG. 6, the studs 23, 23¹ in the hub portion of the levers 11, 11¹ engage guides 27, 27¹ and the studs 22, 22¹ in the lever 7, 7¹ engage guides 26 thereby to assure that the lever pairs are free of the record during rotation.

It will now be appreciated that what has been provided is an apparatus for automatically and accurately centering records of various sizes on a record support adapted for helical, vertical and rotational translation between a load position and a play position. Two lever pairs are mounted for pivoting about diametrically opposed pivot points and are guided to assure centering of record. Furthermore, at least one of the lever pairs is arranged to sense the size and position of the record to trigger the record support for helical translation at the proper time.

I claim:

1. In a record player apparatus for automatically guiding and centering records of different sizes on a driving spindle, the combination comprising, a base, a record support helically rotatable on the base between a raised load position for receiving a record and a lowered play position for positioning a record on the driving spindle, two pairs of levers mounted for pivotable movement on the support at diametrically opposed pivot points, means on the levers for engaging a record in the load position, guide means for the levers for guiding the record to a centered position as the record is inserted into the player, and trigger means responsive to the degree of deflection of the lever pairs for initiating the helical rotation of the record support from the load to the play position.

2. The combination as set out in claim 1 in which the degree of deflection of the lever pairs is a function of the diameter and position of an inserted record.

3. The combination set out in claim 1 in which each lever comprises a partly circular hub portion, an arm extending from the hub, and means on the arm for contacting the record, the hub portions of the levers of a pair being superimposed when the lever pairs are mounted on their associated pivots.

4. The combination as set out in claim 3 in which the trigger means comprise apertures in the superimposed partly circular hubs of at least one pair of levers, said apertures being disposed for relative alignment when a record is properly positioned on the record support, and means for sensing said relative alignment for initiating the helical rotation of the record support from the load to the play position.

5. The combination as set out in claim 1 in which the trigger means comprise apertures in the levers of at least one pair, said apertures being disposed for relative alignment when a record is properly positioned on the record support, and means for sensing said relative alignment for initiating the helical rotation of the record support from the load to the play position.

6. The combination as set out in claim 1 further including a stud on each of said levers, and slot means in the base for engaging the studs as the record support is rotated to the play position thereby to release the record engaging means for rotation of the record by the spindle.

7. The combination as set out in claim 1 further including release means associated with the levers for engaging the base as the record support is rotated to the play position, thereby to release the record engaging means for rotation of the record by the spindle.

8. The combination as set out in claim 1 in which the record support includes helical ramps and the base includes cooperating slots whereby rotation of the record support causes helical movement thereof.

9. The combination as set out in claim 8 in which the levers include release means for engaging the base to cause additional rotation of the levers thereby to release the record engaging means for rotation of the record by the spindle.

* * * * *